United States Patent
Nishidate

(10) Patent No.: US 8,692,436 B2
(45) Date of Patent: Apr. 8, 2014

(54) BRUSHLESS MOTOR

(75) Inventor: Masahiro Nishidate, Isesaki (JP)

(73) Assignee: Tokyo Parts Industrial Co., Ltd., Gunma-ken (JP)

( * ) Notice: Subject to any disclaimer, the term of this patent is extended or adjusted under 35 U.S.C. 154(b) by 347 days.

(21) Appl. No.: 13/200,150

(22) Filed: Sep. 19, 2011

(65) Prior Publication Data
US 2012/0139376 A1    Jun. 7, 2012

(30) Foreign Application Priority Data
Dec. 6, 2010  (JP) ................. 2010-271239

(51) Int. Cl.
- *H02K 5/167* (2006.01)
- *H02K 7/09* (2006.01)
- *G11B 19/20* (2006.01)

(52) U.S. Cl.
CPC ............. *H02K 5/1675* (2013.01); *H02K 7/09* (2013.01); *G11B 19/2009* (2013.01)
USPC ................. 310/216.114; 310/67 R; 310/90; 310/216.116

(58) Field of Classification Search
USPC ......... 310/67 R, 90, 154.1, 216.114–216.116
See application file for complete search history.

(56) References Cited

U.S. PATENT DOCUMENTS

| | | | | |
|---|---|---|---|---|
| 5,623,382 A | * | 4/1997 | Moritan et al. | 360/99.08 |
| 5,925,949 A | * | 7/1999 | Jung et al. | 310/67 R |
| 7,002,272 B2 | * | 2/2006 | Tsuchiya | 310/85 |
| 7,276,826 B2 | * | 10/2007 | Nishidate | 310/67 R |
| 7,525,227 B2 | * | 4/2009 | Tsuchiya et al. | 310/90 |
| 7,743,484 B2 | * | 6/2010 | Fukumaru et al. | 29/598 |
| 2004/0245873 A1 | * | 12/2004 | Lu et al. | 310/90 |

FOREIGN PATENT DOCUMENTS

JP        11-055898        2/1999

* cited by examiner

*Primary Examiner* — Tran Nguyen

(57) ABSTRACT

In a brushless motor comprising: a stator S having a stator core 14 arranged surrounding a bearing part, and a core cover 15 arranged on a surface of the stator core; and a rotor R having a rotational shaft 22, a rotor case 21, and a drive magnet 25, the core cover 15 itself has an integrally formed rotor retaining part that enters a groove 22a in the rotational shaft 22.

8 Claims, 10 Drawing Sheets

(a)

(b)

(a)

(b)

BRUSHLESS MOTOR

BACKGROUND OF THE INVENTION

1. Field of the Invention

The present invention relates to a brushless motor for rotating an optical disc, a magneto-optical disc or the like.

2. Description of the Related Art

Disk devices equipped with head mechanisms for reading information recorded on a disk or writing information to a disk are known in the form of devices for optical disks including CDs, DVDs and MDs, and for magneto-optical disks. In such disk devices, outer-rotor type brushless motors are used as so-called spindle motors that drive the disc in rotation.

When the disk device is used, it is necessary to load and unload a disk on a turntable that is united with the rotor of the spindle motor, and when the disc is removed from the turntable, a force is applied in the direction that would cause the rotor to come off the bearing. Consequently, the spindle motor requires a mechanism that prevents the rotor from coming off the bearing.

In response to such needs, a spindle motor of this sort, which is shown in FIG. 11, was disclosed in Japanese Patent Laid-Open Publication No. H11-55898. This spindle motor comprises a rotor having a drive magnet 108 at the inside of a rotor case 107, and a stator core 106 on which a coil is wound, and which is arranged facing the drive magnet 108. A washer 104 having a hole that is smaller than the outer diameter of a rotary shaft 101 is fixed in place at the end of a bearing 102 by a cap 105, which is held in a bearing housing 103, and a slit 101a is provided in the portion of the rotary shaft 101 that passes through the washer 104.

With the spindle motor in FIG. 11, if the rotor 107 moves in the direction that is upwards in FIG. 11 when the disc is removed, the inner diameter portion of the washer 104 strikes the stepped portion where the slit 101a is provided in the rotational shaft 101, whereby the rotor 107 can be prevented from coming off the stator. Furthermore, with the spindle motor in FIG. 11, oil within the bearing is prevented from flying out by way of a labyrinth seal formed by the slit 101a in the rotational shaft 101 and the washer 104.

However, with the motor in FIG. 11, because the mechanism that prevents the rotor from coming off and the mechanism that prevents the oil from flying out necessitate the washer 104 and the cap 105, the number of parts is increased, which is a problem in that manufacturing costs are increased.

SUMMARY OF THE INVENTION

One or more embodiments of the present invention provide a brushless motor that allows a rotor retaining structure to be realized, without adding special parts.

Furthermore, one or more embodiments of the present invention provide a brushless motor that can prevent oil within the bearing from flying out, without adding special parts.

According to one or more embodiments of the present invention, the brushless motor comprises: a stator S having a bearing part, a stator core 14 arranged surrounding the bearing part, and a core cover 15 arranged on a surface of the stator core 14; and rotor R having a rotational shaft 22 that is rotatably supported in the bearing part, a rotor case 21 that rotates united with the rotational shaft 22, and a drive magnet 25 that is fixed in place on the rotor case 21, wherein the rotational shaft 22 has an annular groove 22a on the outer circumference thereof; and the core cover 15 has a rotor retaining part that enters the groove 22a.

Furthermore, according to one or more embodiments of the present invention, the brushless motor comprises: a stator S having a bearing part, a stator core 14 arranged surrounding the bearing part, and a core cover 15 arranged on a surface of the stator core 14; and rotor R having a rotational shaft 22 that is rotatably supported in the bearing part, a rotor case 21 that rotates united with the rotational shaft 22, and a drive magnet 25 that is fixed in place on the rotor case 21, wherein the rotor case 21 has an annular groove 21d in the outer circumference of a burring part 21c in which the rotational shaft 22 is mounted; and the core cover 15 has a rotor retaining part that enters the groove 21a.

In the structure described above, the core cover 15 may cover the top face of the bearing part.

In the structure described above, the stator core 14 may comprise a central annular part 14a and a planar core wherein a plurality of salient poles 14b are joined to the annular part 14a; and the core cover 15 may have a ring-shaped part 15a arranged on the annular part 14a, a plurality of branch parts 15b that are radially joined to the periphery of the ring-shaped part 15a and fitted on the salient poles 14b, an annular wall 15c that is erected on the interior portion of the ring-shaped part 15a, and a flange 15d that protrudes inwardly from the annular wall 15c.

In the structure described above, the flange 15d may be divided into a plurality of tongue pieces.

In the structure described above, an inclined part 15g that is inclined in the downward axial direction may be provided at the interior of the flange 15d.

Furthermore, in the structure described above, the stator core 14 may comprise a central annular part 14a and a planar core wherein a plurality of salient poles 14b are joined to the annular part 14a; an attraction magnet 31 that attracts the rotor case 21 may be arranged on the annular part 14a; and the core cover may have a positioning part 15h for positioning the attraction magnet 31.

Furthermore, in the structure described above, the core cover may have a ring-shaped part 15a arranged on the annular part 14a, a plurality of branch parts 15b that are radially joined to the periphery of the ring-shaped part 15a and fitted on the salient poles 14b, an annular wall 15c that is erected on the interior portion of the ring-shaped part 15a, a flange 15d that protrudes inwardly from the annular wall 15c, and a drop wall 15i that is formed on the bottom of the flange 15d; and the positioning part 15h may be formed by at least the ring-shaped wall 15c and the drop wall 15i.

With the structures described above, a rotor retaining part is provided on the core cover, which enters the groove on the rotational shaft or the groove on the burring part on the rotor case, whereby a rotor retaining structure can be realized without adding special parts.

Furthermore, because the core cover covers the top face of the bearing part, oil within the bearing can be prevented from flying out without adding special parts.

Furthermore, because a positioning part for positioning the attraction magnet is also provided, a rotor retaining structure and a rotor attraction structure can be realized without adding special parts.

DESCRIPTION OF THE PREFERRED EMBODIMENTS

Hereinafter, modes of embodiment of the present invention are illustratively described based on the drawings, but the present invention is not limited to these modes of embodiment, and the present invention can be practiced with suitable changes to the various component parts and the like without departing from the scope of the invention.

First Mode of Embodiment

Figure 1:
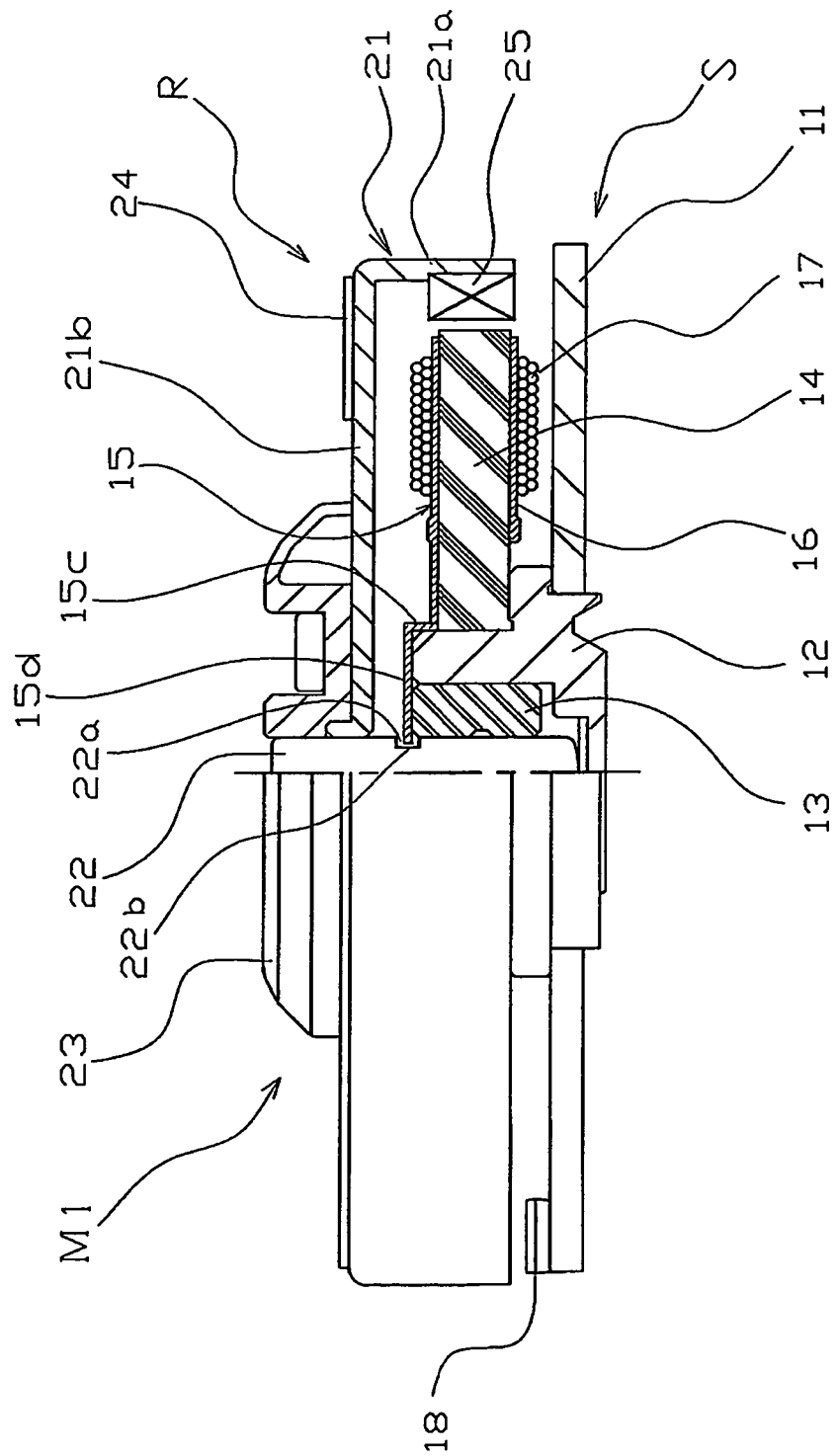
FIG. 1 is a side view of a brushless motor M1 according to a first mode of embodiment of the present invention, the right half of the drawing showing a sectional view.

The configuration of a brushless motor according to this mode of embodiment is described with reference to FIG. 1. FIG. 1 is a side view illustrating this example of a brushless motor M1, the right half of the drawing showing a sectional view. This brushless motor M1 primarily comprises a stator S and a rotor R.

The stator S has: a bearing part comprising a bearing holder 12 and a bearing 13; a stator core 14 disposed surrounding this bearing; and core covers 15, 16 disposed on surfaces of the stator core 14.

The bearing holder 12 is made by cutting brass to produce a bottomed cylinder, and is mounted on a base 11 wherein a so-called steel substrate with a printed circuit formed on the surface, or a steel plate overlaid on a printed circuit board is mounted. Furthermore, a Hall element 18 is provided on the base 11 facing a drive magnet 25, which is described hereafter; the rotation of the rotor R can be detected by this Hall element 18.

The bearing 13 is accommodated within the bearing holder 12 so as to constitute the bearing part, and the stator core 14 is mounted outside the bearing holder 12. Furthermore, a thrust member is fixed in place at the bottom of the bearing holder 12. Downward movement of the rotor R is limited as a result of this thrust member abutting the bottom of a rotational shaft 22, which is described hereafter.

The bearing 13 is made by impregnating a cylinder of sintered metal with lubricating oil, and is fixed in place, by press fitting or the like, on the inner circumferential face of the bearing holder 12. Note that the bearing holder 12 and the bearing 13 may be of the same material and may be united, and maybe united with the base 11 by way of resin or the like.

Figure 2:
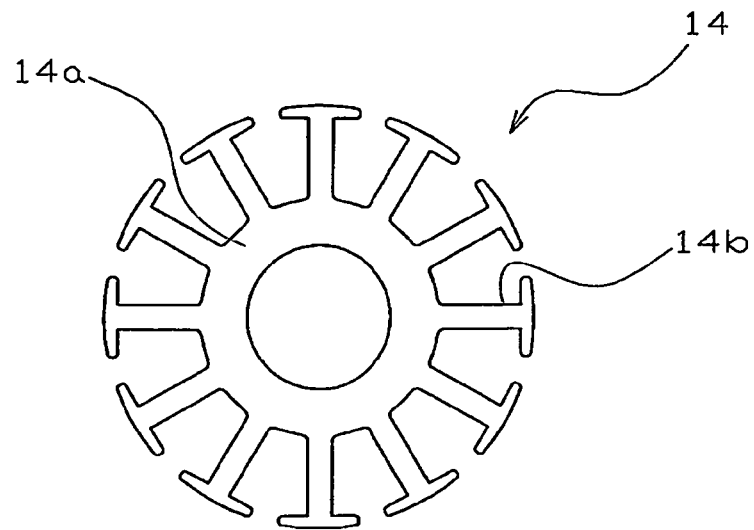
FIG. 2 is a plan view of a stator core 14 in the brushless motor of FIG. 1.

As shown in FIG. 2, the stator core 14 comprises a central annular part 14a and a planar core laminate, wherein a plurality of salient poles 14b are formed, which are joined to the periphery of this annular part 14a and magnetically connected. Note that the stator core 14 in this example has 12 salient poles 14b at a pitch of 30°. The stator core 14 is fixed in place on the bearing holder 12 by way of fitting the bearing holder 12 into the annular part 14a.

The stator core 14 is formed from a magnetic metallic material, and in general the magnetic metallic material is an electrically conductive material. The core covers 15, 16, which are made from an insulating resin, are therefore disposed on the surfaces of the stator core 14, from above and below, and the coil 17 is wound with these core covers 15, 16 therebetween. This example is three-phase, with a star connection, and therefore the coil 17 is wound with the U, V, W phases on successive salient poles 14b so that each phase of the coil is wound on four respective salient poles.

Figure 3:
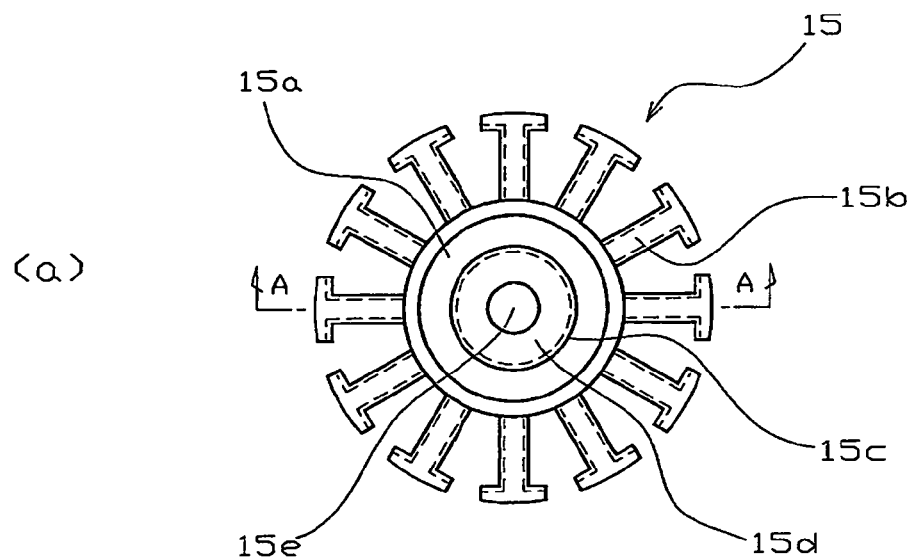
FIG. 3 shows a core cover 15 in the brushless motor of FIG. 1, wherein (a) is a plan view, and (b) is a sectional view of a section according to the line A-A in (a).
Figure 3:
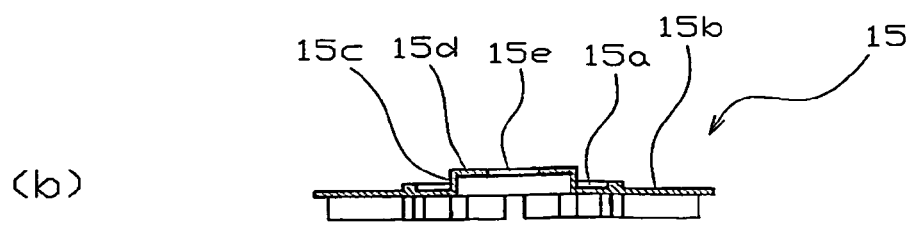

As shown in FIG. 3, the upper core cover 15 comprises a ring-shaped part 15a that is disposed on the annular part 14a of the stator core 14; a plurality of branch parts 15b, which are radially joined to the periphery of this ring-shaped part 15a; an annular wall 15c, which is erected on the interior portion of the ring-shaped part 15a; and a flange 15d that extends inwardly from the annular wall 15c. The branch parts 15b have recessed sections, 12 branch parts 15b being provided at a pitch of 30°, in the same manner as the salient poles 14b of the stator core 14, so as to be fitted onto each of the salient poles 14b of the stator core 14. The annular wall 15c is disposed at the upper periphery of the bearing holder 12. The flange 15d is arranged so as to cover the top faces of the bearing holder 12 and the bearing 13. A hole 15e is provided in the center of the flange 15d, and the rotational shaft 22, which is described hereafter, is inserted into the bearing part through this hole 15e. The flange 15d, which is described in more detail hereafter, prevents the rotor R from coming off the stator S when a force acts on the rotor R in the direction that is upward in FIG. 1.

The rotor R comprises: a rotational shaft 22, which is rotatably supported in the bearing part; a rotor case 21, which rotates united with the rotational shaft 22, and a drive magnet 25, which is fixed in place on the rotor case 21.

The rotor case 21 is formed, in the shape of a cap, from a magnetic sheet material, and comprises a cylindrical part 21a, which is formed as a cylinder concentric with the rotational shaft 22, and a planar part 21b, which is formed as a plane perpendicular to the rotational shaft 22. The cylindrical drive magnet 25 is mounted on the inside of the cylindrical part 21a, radially facing the salient poles 14b of the stator core 14. This drive magnet 25 is magnetized in an alternating N/S multipolar fashion, in the circular direction. The planar part 21b of the rotor case 21 has a disc guide 23, which is formed integrally with the planar part 21b, and a friction sheet 24, which allow the rotor R to function as a turntable.

The rotational shaft 22 is fixed in place in the center of the planar part 21b of the rotor case 21, and passes through the hole 15e in the core cover 15, so as to be rotatably supported in the bearing 13. An annular groove 22a is formed at the external circumference of the rotational shaft 22.

The diameter of the hole 15e in the core cover 15 is smaller than the diameter of the portion of the rotational shaft 22 where the groove 22a is not formed, and larger than the diameter of the portion of the rotational shaft 22 where the groove 22a is formed. Consequently, the inner diameter portion of the flange 15d of the core cover 15 enters the groove 22a in a manner such that the inner diameter portion of the flange 15d does not contact the rotational shaft 22.

The rotor R is assembled with the stator S by inserting the rotational shaft 22 into the bearing 13. In the course of this assembly, the rotational shaft 22 hits the inner diameter portion of the flange 15d, but as the flange 15d extends from the interior the core cover 15, which is made of an elastic material such as a resin, when pressed by the rotational shaft 22, the inner diameter portion of the flange 15d can be elastically deformed in the downward axial direction.

Thus, the rotational shaft 22 is ultimately inserted into the bearing 13 as shown in FIG. 1, and the inner diameter portion of the flange 15d of the core cover 15 enters the groove 22a, without contacting the rotational shaft 22. Consequently, if the rotor R is moved in the direction that is upward in FIG. 1, for example when a disk is removed, the bottom face 22b of the groove 22a strikes the flange 15d, whereby the rotor R can be prevented from coming off the stator S. In other words, the flange 15d that enters the groove 22a in the rotational shaft 22 functions as a rotor retaining part that prevents the rotor R from coming off the stator S.

Thus, in the brushless motor M1 in this example, because the flange 15d, which functions as a rotor retaining part by entering the groove 22a of the rotational shaft 22, is formed integrally with the core cover 15, a rotor retaining structure can be achieved without adding special parts. Furthermore, with the brushless motor M1 in this example, because the top faces of the bearing holder 12 and the bearing 13 are covered by the flange 15d of the core cover, it is possible to prevent lubricating oil within the bearing from flying out, and thus increase the life of the motor, without adding special parts.

Note that, in this example, the flange 15d of the core cover 15 that functions as a rotor retaining part is formed in a flat ring shape, but the retaining force can be adjusted by suitably designing the thickness, shape and the like of the flange 15d. Specifically, core covers such as shown in FIG. 4 or FIG. 5 can, for example, be used.

Figure 4:
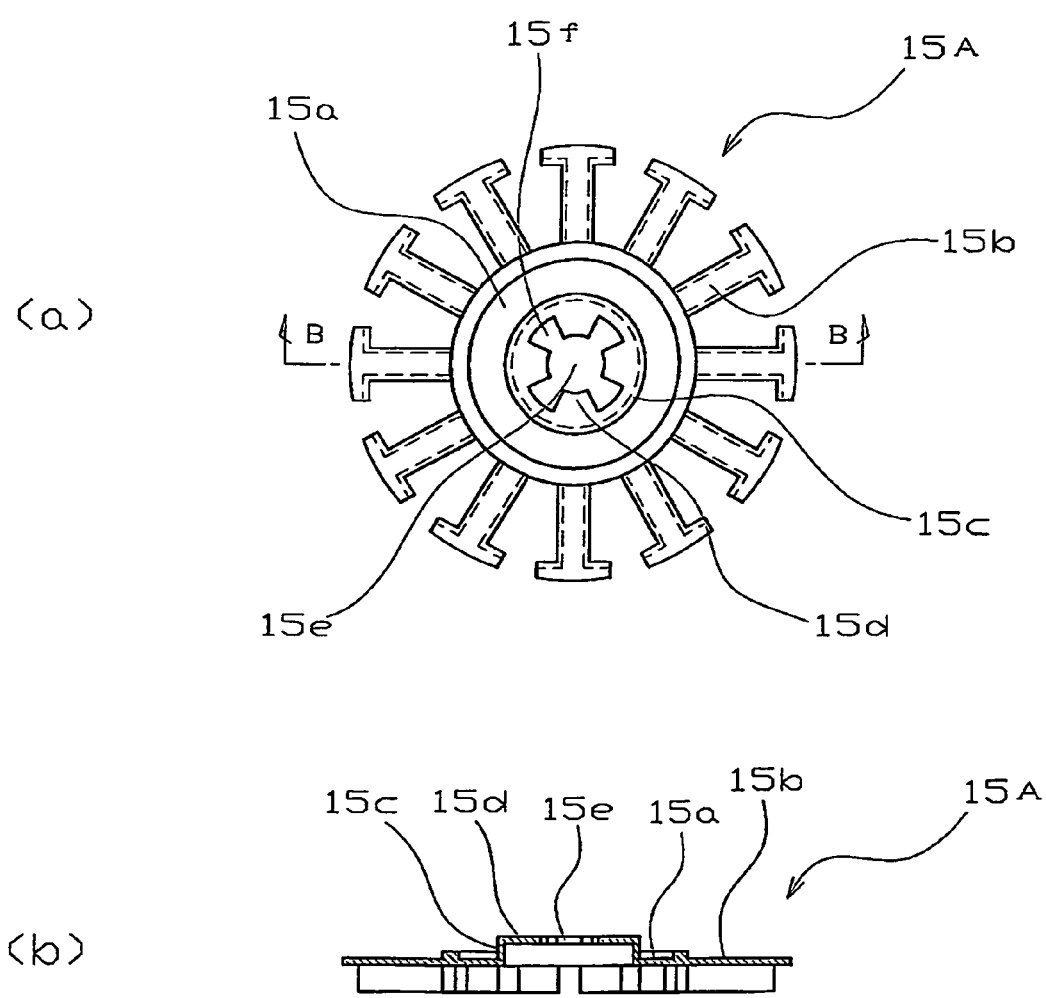
FIG. 4 shows another example of a core cover that can be applied to the brushless motor of the present invention, wherein (a) is a plan view and (b) is a sectional view of a section according to the line B-B in (a).
Figure 5:
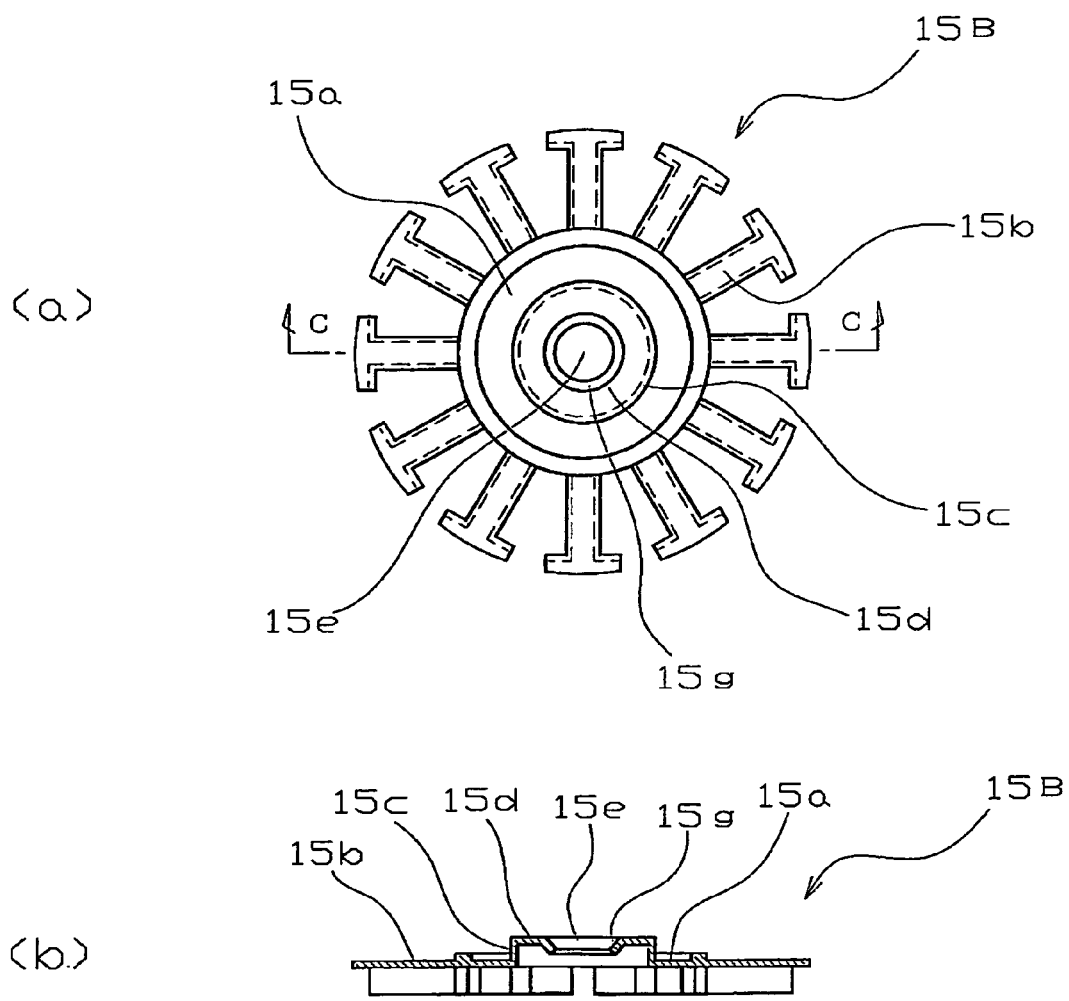
FIG. 5 shows another example of a core cover that can be applied to the brushless motor of the present invention, wherein (a) is a plan view and (b) is a sectional view of a section according to the line C-C in (a).

The core cover 15A in FIG. 4 is such that the flange 15d is divided into a plurality of tongue pieces by way of providing cutouts 15f, so as to produce a shape with which the flange 15d can easily be elastically deformed. Furthermore, the core cover 15B in FIG. 5 is provided with an inclined part 15g, wherein the inside portion of the flange 15d is inclined in the downward axial direction. With such a shape, the rotational shaft 22 readily slides on the inclined part 15g and the inclined part 15g can easily be caused to elastically deform, whereby assembly of the rotor R can easily be performed. Furthermore, after assembling the rotor R, a greater retaining force can be realized.

Figure 6:
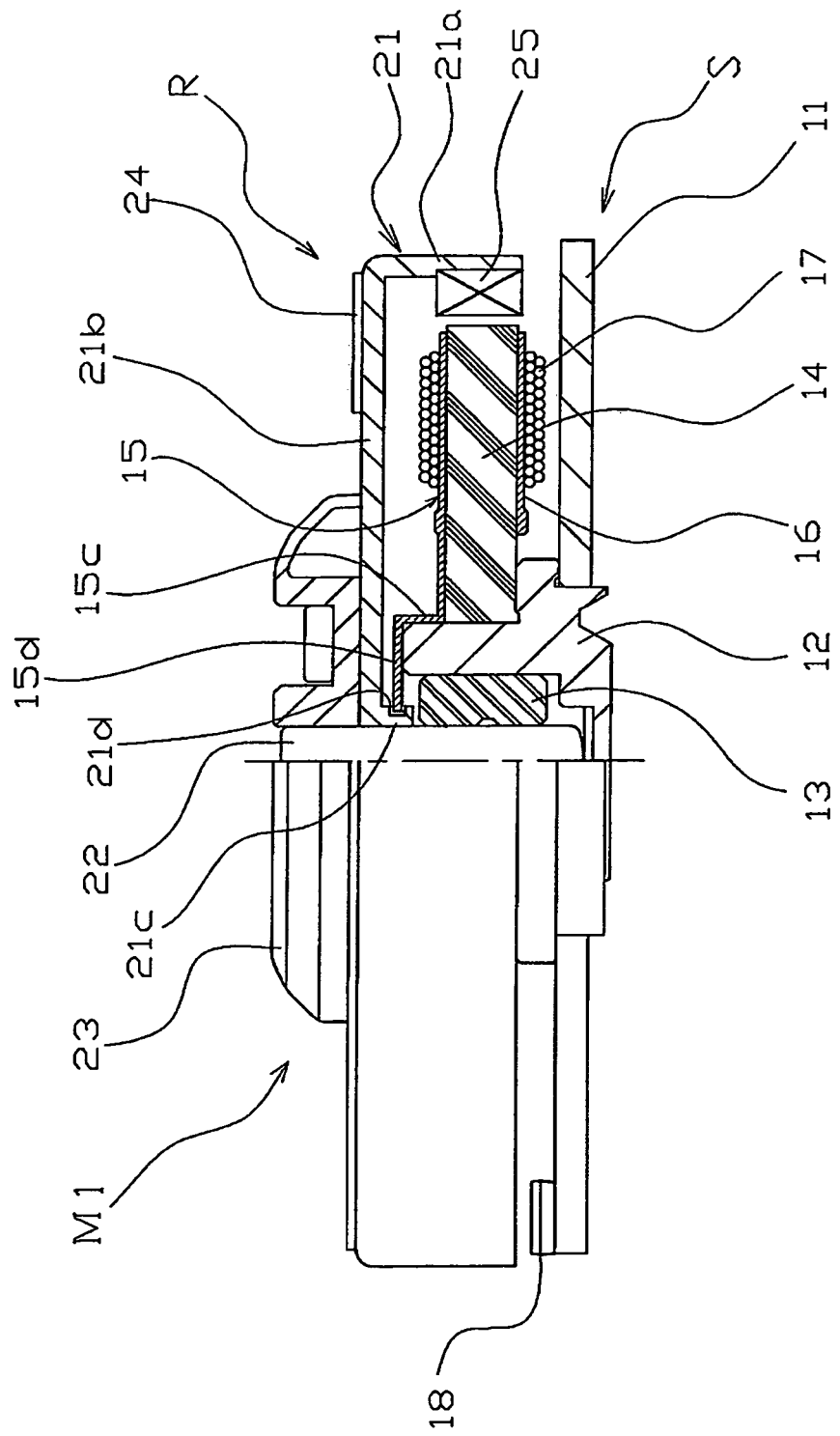
FIG. 6 is a side view showing another example of a brushless motor of the present invention, the right half of the drawing showing a sectional view.

Furthermore, with the brushless motor in FIG. 1, the flange 15d enters the groove 22a in the rotational shaft 22 as a rotor retaining part but, as shown in FIG. 6, an annular groove 21d can be formed at the outer circumference of a burring part 21c of a rotor case 21 in which the rotational shaft 22 can be mounted, and the flange 15d can fit into this groove 21d as a rotor retaining part. With this configuration as well, a rotor retaining structure can be realized without adding special parts, and the top faces of the bearing holder 12 and the bearing 13 is covered by the flange 15d of the core cover, whereby lubricating oil within the bearing can be prevented from flying out, so as to increase the life of the motor, without adding special parts. Note that, with the core cover 15 in FIG. 6 as well, the shape of the inner diameter portion of the flange 15d that functions as a rotor retaining part can be formed in the manner of the core cover 15A or 15B that is shown in FIG. 4 or FIG. 5.

Second Mode of Embodiment

Figure 7:
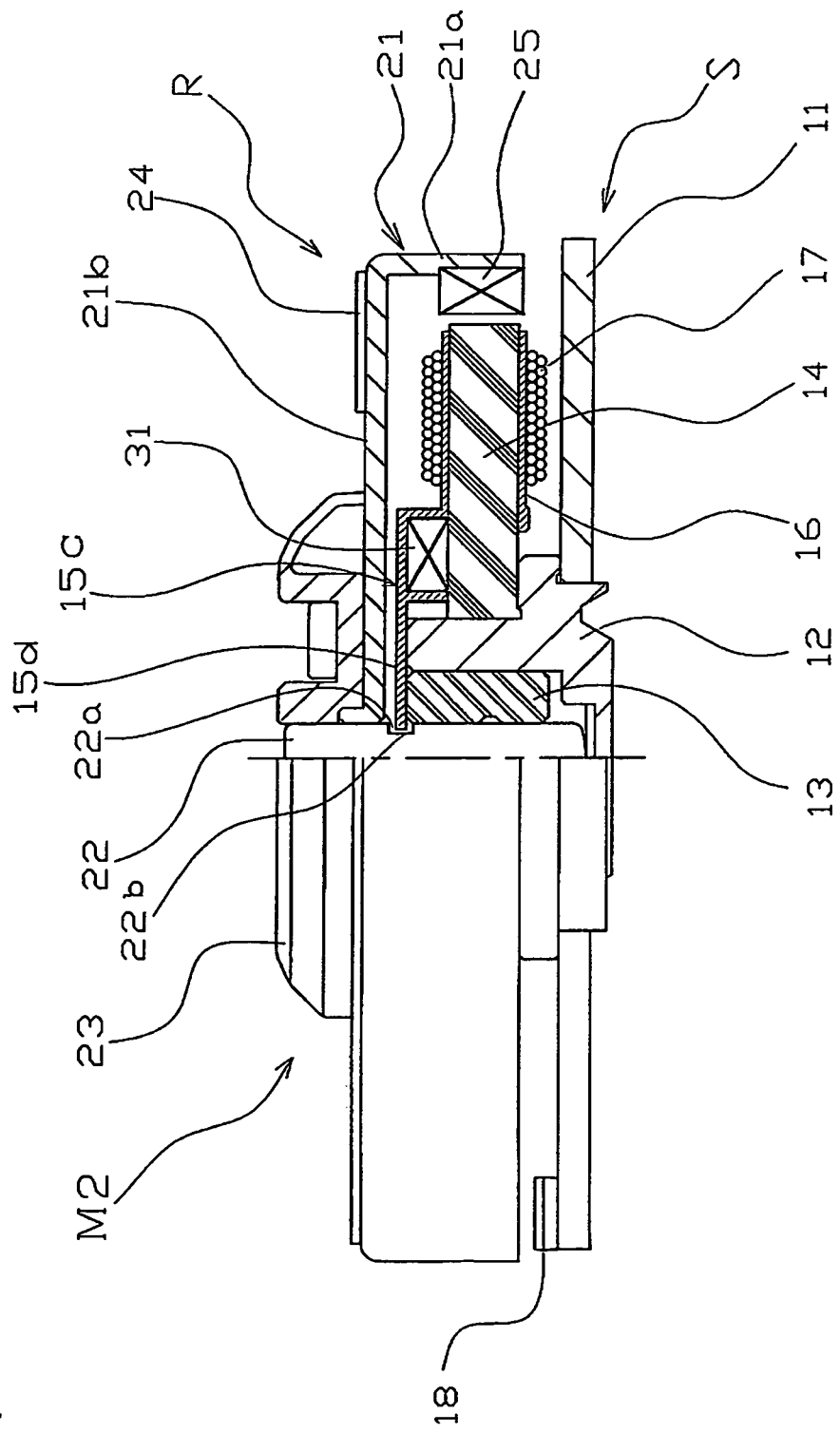
FIG. 7 is a side view of a brushless motor M2 according to a second mode of embodiment of the present invention, the right half of the drawing showing a sectional view.

The configuration of a brushless motor according to this mode of embodiment is described with reference to FIG. 7. FIG. 7 is a side view showing this example of a brushless motor M2, the right half of the drawing showing a sectional view. In FIG. 7, parts labeled with the same reference numerals as in FIG. 1 indicate like parts, and detailed descriptions of these parts are omitted.

The differences between the brushless motor M2 in this example and the brushless motor M1 in FIG. 1 are that an attraction magnet 31 is provided for attracting the rotor R toward the stator S and a core cover 15C is used which is provided with a positioning part 15h for positioning the attraction magnet 31.

With spindle motors that drive discs in rotation, it may happen that a levitating force is generated in the disk, due to the rotation of the disk. If the rotor moves in the axial direction as a result of this levitating force, the height of the disk changes, which tends to produce data read errors and data write errors. In order to prevent such errors, the brushless motor M2 in this example is provided with an attraction magnet 31 for attracting the rotor R towards the stator S.

This attraction magnet 31 comprises an annular magnet that has been bipolar magnetized in the axial direction, and which is arranged on the annular part 14a of the stator core 14, so as to attract the planar part 21b of the rotor case 21.

Figure 8:
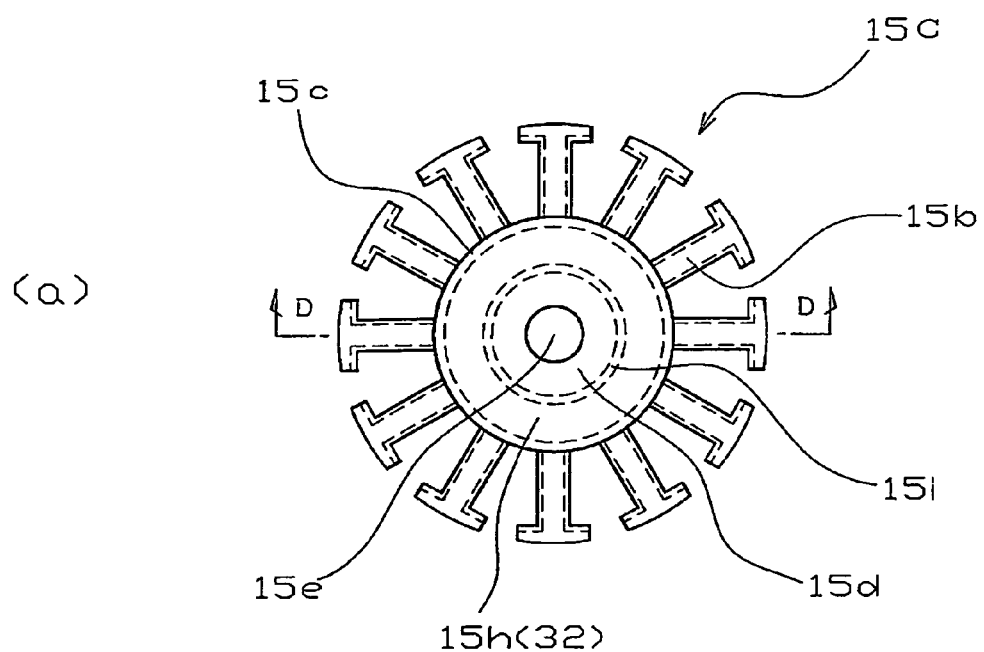
FIG. 8 shows a core cover 15C in the brushless motor of FIG. 7, wherein (a) is a plan view and (b) is a sectional view of a section according to the line D-D in (a).
Figure 8:
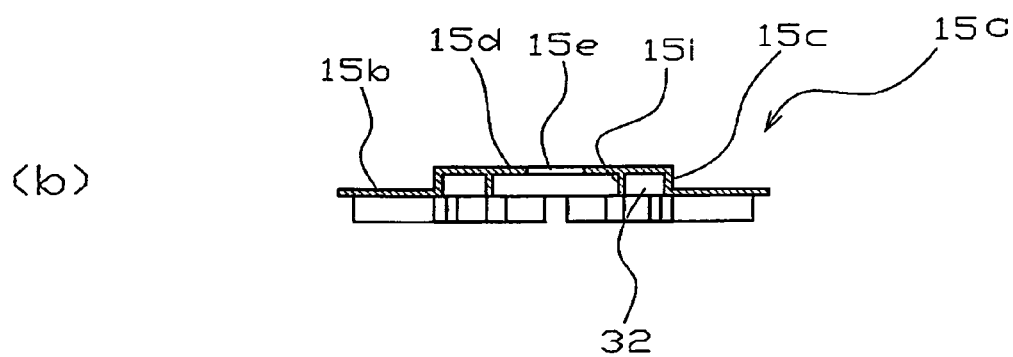

If the position of the attraction magnet 31 is different in each motor, there will be variations in quality between the motors, and thus it is necessary to accurately position the attraction magnet 31. Thus, in this example, as shown in FIG. 8, a positioning part 15h is provided for positioning the attraction magnet 31 on the core cover 15C.

This positioning part 15h comprises the annular wall 15c, which rises in the axial direction at the inside of the branch parts 15b, and a drop wall 15i, which is formed on the bottom of the flange 15d. The drop wall 15i is formed concentrically with the annular wall 15c. The heights of the annular wall 15c and the drop wall 15i are substantially equal to the thickness of the attraction magnet 31; the inner diameter of the annular wall 15c is substantially equal to the outer diameter of the attraction magnet 31; and the outer diameter of the drop wall 15i is substantially equal to the inner diameter of the attraction magnet 31. The attraction magnet 31 is mounted in a space 32 below the flange 15d, which lies between the annular wall 15c and the drop wall 15i, so that the position thereof is radially constrained.

With the brushless motor M2 of this example, by mounting the core cover 15C on the stator core 14 with the attraction magnet 31 mounted inside the positioning part 15h, the attraction magnet 31 is automatically positioned so that the center of the attraction magnet 31 coincides with the center of the rotational shaft 22. Consequently, in addition to the effects produced by the brushless motor M1 in the first mode of embodiment, a rotor R attraction structure can be realized, in which the attraction magnet 31 that prevents movement of the rotor R in the axial direction can be positioned in a very simple manner, without adding special parts.

In this example, an annular attraction magnet 31 is used, but an arcuate magnet may be used as the attraction magnet so that a certain force resulting from the magnetic force acts on the rotor R not only in the axial direction (the so-called thrust direction) but also in the radial direction, so as to prevent eccentric rotation of the rotational shaft. If an arcuate magnet is used as the attraction magnet, a core cover such as shown in FIG. 9 or FIG. 10 can, for example, be used.

Figure 9:
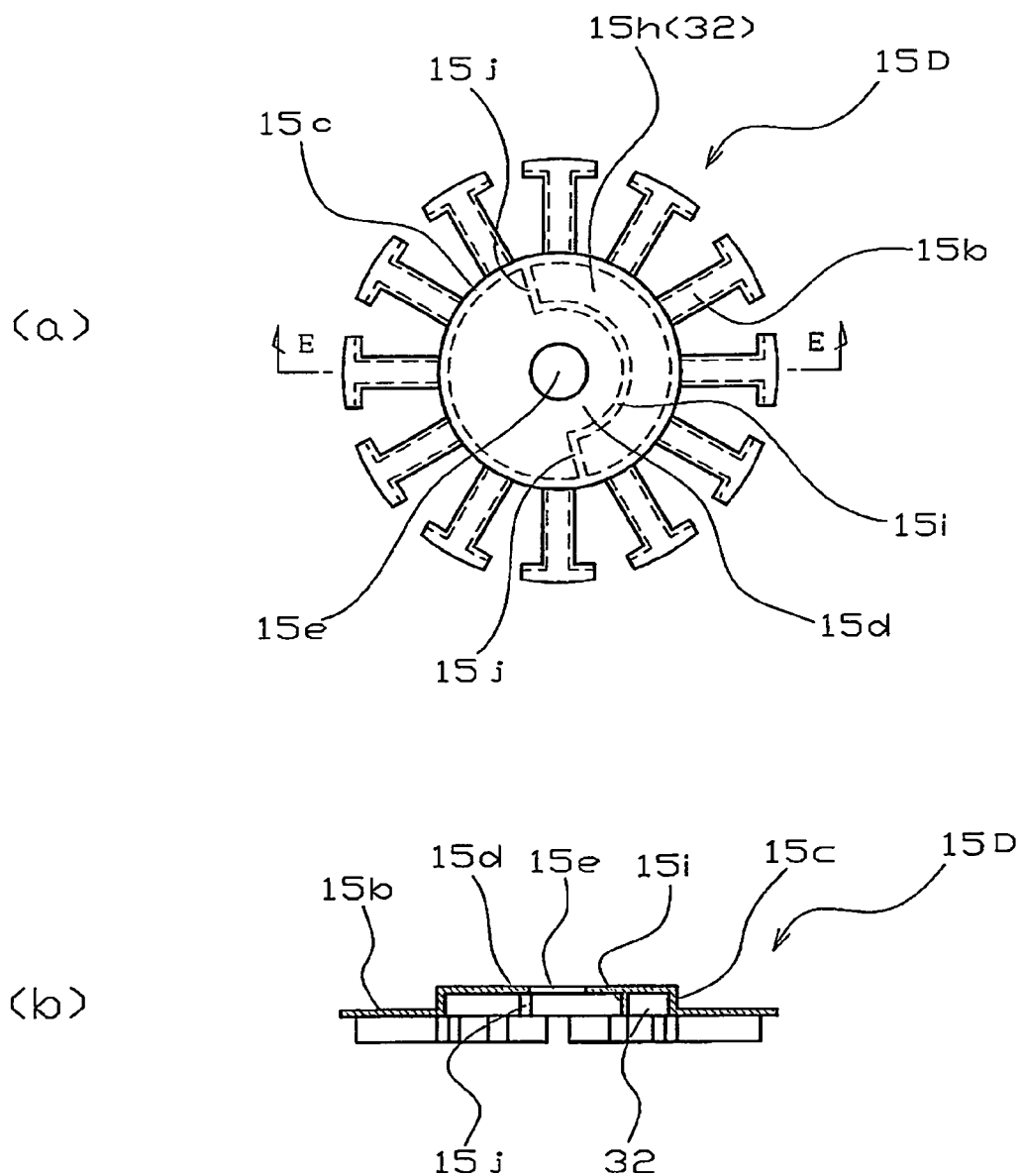
FIG. 9 shows another example of a core cover that can be applied to the brushless motor of the present invention, wherein (a) is a plan view and (b) is a sectional view of a section according to the line E-E in (a).

The core cover 15D shown in FIG. 9 can be used in cases where a magnet having a 180° arc shape is used as the attraction magnet. The positioning part 15h of this core cover 15D comprises the annular wall 15c that rises in the axial direction at the inside of the branch parts 15b, a drop wall 15i that is formed as a semicircle on the bottom of the flange 15d, and dividing walls 15j, which continue from both ends of the drop wall 15i. As a result, a space 32 for receiving an attraction magnet having a 180° arc shape is formed below the flange 15d.

Figure 10:
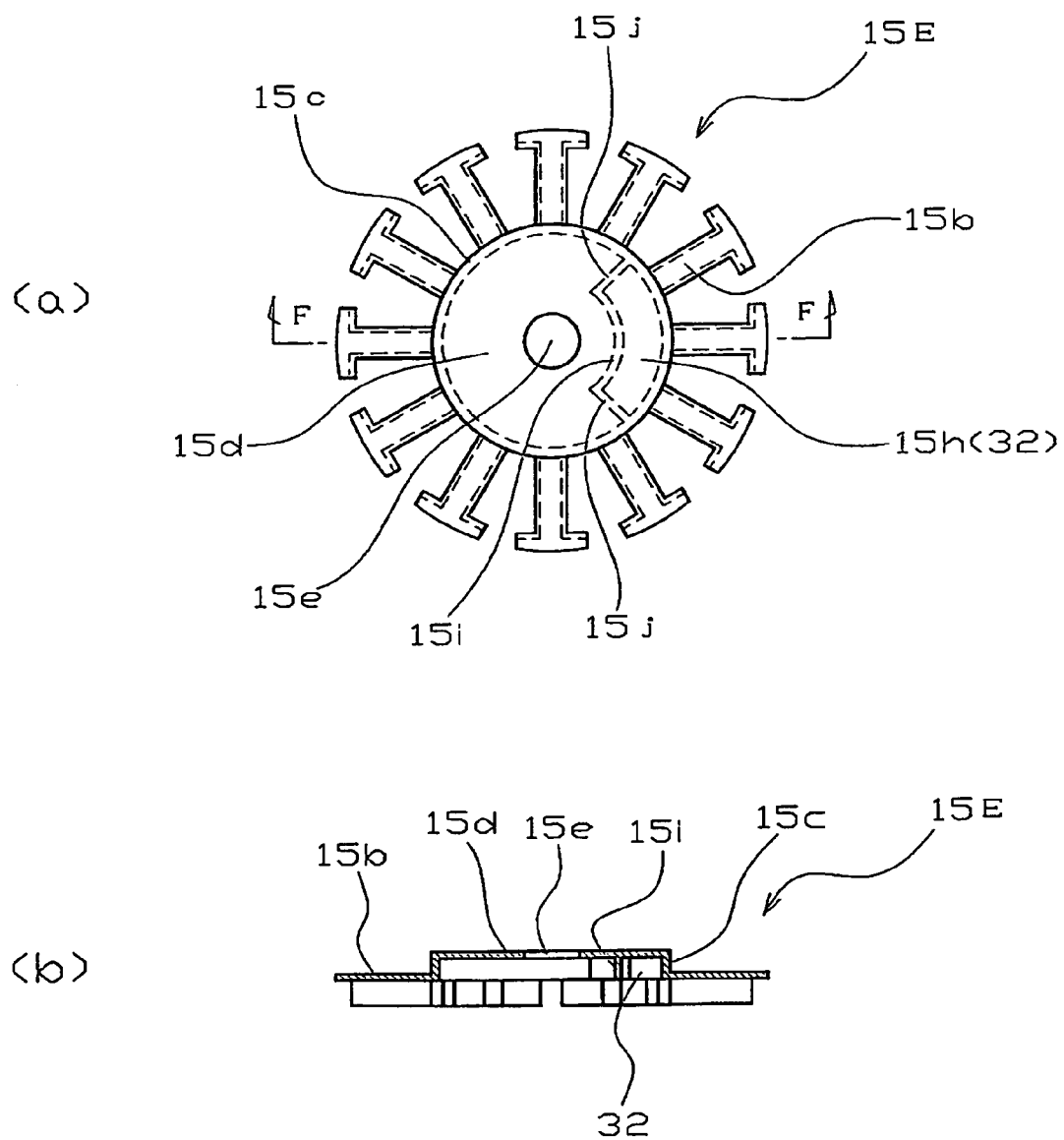
FIG. 10 shows another example of a core cover that can be applied to the brushless motor of the present invention, wherein (a) is a plan view and (b) is a sectional view of a section according to the line F-F in (a).
Figure 11:
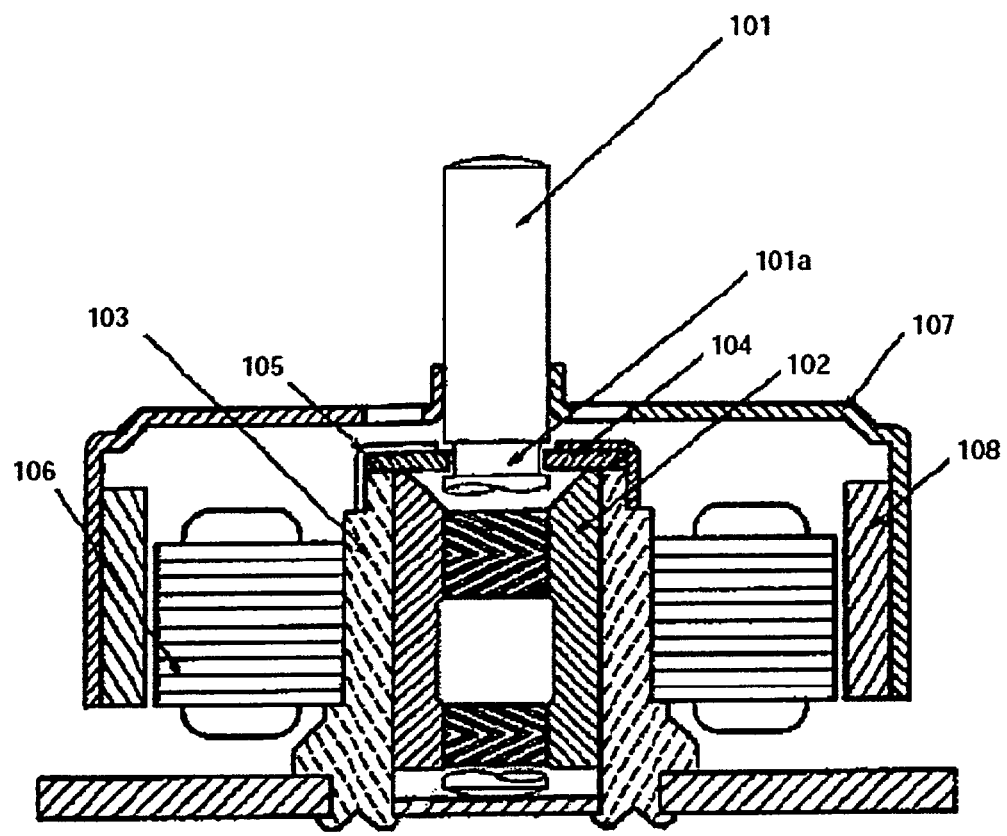
FIG. 11 is a sectional view of a conventional spindle motor.

The core cover 15E shown in FIG. 10 can be used in cases where a magnet having a 90° arc shape is used as the attraction magnet. The positioning part 15h of this core cover 15E comprises the annular wall 15c that rises in the axial direction at the inside of the branch parts 15b, a drop wall 15i that is formed in a 90° arc shape on the bottom of the flange 15d, and dividing walls 15j, which continue from both ends of the drop wall 15i. As a result, a space 32 for receiving an attraction magnet 31 having a 90° arc shape is formed below the flange 15d.

If an arcuate attraction magnet with a predetermined angle is used in this manner, a core cover should used wherein dividing walls 15j are integrally formed, in order to form a space 32 that corresponds to the shape of the attraction magnet, in the manner of the core cover 15D and the core cover 15E. If a core cover of this sort is used, the core cover is mounted on the stator core with the attraction magnet mounted in the positioning part, whereby the attraction magnet can be automatically positioned.

Note that, with the core covers 15C, 15D, 15E in FIGS. 8 to 10 as well, the shape of the inner diameter portion of the flange 15d that functions as a rotor retaining part can be formed in the manner of the core cover 15A or 15B that is shown in FIG. 4 or FIG. 5. Furthermore, with the core covers 15C, 15D, 15E in FIGS. 8 to 10 as well, the inner diameter portion of the flange 15d that functions as a rotor retaining part can enter the groove 21d of the burring part 21c of the rotor case 21, as shown in FIG. 6.

As described above, with the brushless motor of the present invention, a rotor retaining part that enters a groove 21d in the rotational shaft 22 or a groove 21d in the burring part 21c of the rotor case 21 is provided on the core cover itself, whereby a rotor retaining structure can be realized by way of the rotational shaft (or rotor case) and the core cover, which are essential parts, without adding special parts. Furthermore, as a positioning part for positioning the attraction magnet is also provided, a rotor retaining structure and a rotor attraction structure can be realized without adding special parts, and without using special tools.

INDUSTRIAL APPLICABILITY

The present invention can be applied to outer-rotor type brushless motors.

DESCRIPTION OF THE REFERENCE NUMERALS AND SIGNS 11 base
12 bearing holder
13 bearing
14 stator core
14a annular part
14b salient pole
15, 15A, 15B, 15C, 15D, 15E, 16 core cover
15a ring-shaped part
15b branch part
15c annular wall
15d flange
15e hole
15f cutout
15g inclined part
15h positioning part
15i drop wall
15j divider wall
17 coil
18 Hall element
21 rotor case
21a cylindrical part
21b planar part
21c burring part
21d groove
22 rotational shaft
22a groove
22b groove bottom
23 disc guide
24 friction sheet
25 drive magnet
31 attraction magnet
32 space
M1, M2 spindle motor
R rotor
S stator

What is claimed is:

1. In a brushless motor comprising a stator having a bearing part, a stator core arranged surrounding said bearing part, and a core cover arranged on a surface of said stator core; and a rotor having a rotational shaft that is rotatably supported in said bearing part, a rotor case that rotates united with said rotational shaft, and a drive magnet that is fixed in place on said rotor case, wherein said rotational shaft has an annular groove at the outer circumference thereof; and said core cover has a rotor retaining part that enters said groove.

2. In a brushless motor comprising a stator having a bearing part, a stator core arranged surrounding said bearing part, and a core cover arranged on a surface of said stator core; and a rotor having a rotational shaft that is rotatably supported in said bearing part, a rotor case that rotates united with said rotational shaft, and a drive magnet that is fixed in place on said rotor case, wherein said rotor case has an annular groove at the outer circumference of a burring part in which said rotational shaft is mounted; and said core cover has a rotor retaining part that enters said groove.

3. The brushless motor recited in claim 1 or 2, wherein said core cover covers a top face of said bearing part.

4. The brushless motor recited in claim 1 or 2, wherein said stator core comprises a central annular part and a plurality of salient poles joined to said annular part; and said core cover has a ring-shaped part arranged on said annular part, a plurality of branch parts that are radially joined to the periphery of the ring-shaped part and fitted on said salient poles, an annular wall that is erected on the inner diameter portion of said ring-shaped part, and a flange that protrudes inwardly from said annular wall.

5. The brushless motor recited in claim 4, wherein said flange is divided into a plurality of tongue pieces.

6. The brushless motor recited in claim 4, wherein an inclined part that is inclined in the downward axial direction is provided at the interior of said flange.

7. The brushless motor recited in claim 1 or 2, wherein said stator core comprises a central annular part and a plurality of salient poles joined to said annular part; an attraction magnet that attracts said rotor case is arranged on said annular part; and said core cover has a positioning part for positioning said attraction magnet.

8. The brushless motor recited in claim 7, wherein said core cover has a ring-shaped part arranged on said annular part, a plurality of branch parts that are radially joined to the periphery of said ring-shaped part and fitted on said salient poles, an annular wall that is erected on the interior portion of said ring-shaped part, a flange that protrudes inwardly from said annular wall, and a drop wall that is formed on the bottom of said flange; and said positioning part is formed by at least said ring-shaped wall and said drop wall.

* * * * *